(12) United States Patent
Choudhary et al.

(10) Patent No.: US 7,803,265 B2
(45) Date of Patent: Sep. 28, 2010

(54) DISTILLATE-TO-GASOLINE CATALYST SYSTEM AND PROCESS THEREFOR

(75) Inventors: Tushar V. Choudhary, Bartlesville, OK (US); Paul F. Meier, Bartlesville, OK (US); Edward L. Sughrue, II, Bartlesville, OK (US); Walter E. Alvarez, Bartlesville, OK (US)

(73) Assignee: ConocoPhillips Company, Houston, TX (US)

( * ) Notice: Subject to any disclaimer, the term of this patent is extended or adjusted under 35 U.S.C. 154(b) by 0 days.

(21) Appl. No.: 12/365,705

(22) Filed: Feb. 4, 2009

(65) Prior Publication Data

US 2009/0134061 A1    May 28, 2009

Related U.S. Application Data

(62) Division of application No. 11/601,125, filed on Nov. 17, 2006, now abandoned.

(51) Int. Cl.
*C10G 45/00* (2006.01)
*C10G 35/00* (2006.01)
*C07C 5/00* (2006.01)

(52) U.S. Cl. .............. 208/49; 208/57; 208/58; 208/59; 208/72; 208/73; 208/74; 208/67; 208/68; 208/75; 208/77; 585/251; 585/258; 585/276; 585/277; 585/269; 585/270; 585/266; 585/268; 585/310; 585/317; 585/360

(58) Field of Classification Search ............ 208/49, 208/58, 59, 72, 73, 74, 67, 68, 75, 77, 57; 585/251, 258, 276, 277, 269, 270, 266, 268, 585/310, 317, 360

See application file for complete search history.

(56) References Cited

U.S. PATENT DOCUMENTS

| 3,448,036 | A | * | 6/1969 | Hayes | 208/139 |
|---|---|---|---|---|---|
| 3,631,117 | A | | 12/1971 | Kovach et al. | 260/666 |
| 3,655,551 | A | * | 4/1972 | Hass et al. | 208/59 |
| 3,799,899 | A | * | 3/1974 | Mears | 528/318 |
| 5,208,005 | A | * | 5/1993 | Miller | 423/702 |
| 5,227,353 | A | * | 7/1993 | Apelian et al. | 502/74 |
| 5,334,792 | A | * | 8/1994 | Del Rossi et al. | 585/314 |
| 5,520,799 | A | * | 5/1996 | Brown et al. | 208/143 |
| 5,763,731 | A | | 6/1998 | McVicker et al. | 585/737 |
| 5,811,624 | A | * | 9/1998 | Hantzer et al. | 585/700 |
| 6,235,962 | B1 | | 5/2001 | Zeuthen | 585/940 |
| 6,500,329 | B2 | | 12/2002 | Tsao et al. | 208/59 |
| 6,589,416 | B2 | | 7/2003 | Baird, Jr. et al. | 208/138 |
| 6,623,626 | B2 | | 9/2003 | Baird, Jr. et al. | 208/137 |
| 2006/0063958 | A1 | | 3/2006 | Galperin et al. | 585/752 |
| 2007/0138054 | A1 | * | 6/2007 | Palmer et al. | 208/33 |

* cited by examiner

*Primary Examiner*—Elizabeth D Wood

(57) ABSTRACT

A process is disclosed for converting distillate to gasoline-range hydrocarbons using a two-stage catalyst system including a first catalyst containing platinum, palladium, or platinum and palladium, and an acidic support, and a second catalyst containing iridium and an inorganic oxide support, and optionally nickel.

19 Claims, No Drawings

DISTILLATE-TO-GASOLINE CATALYST SYSTEM AND PROCESS THEREFOR

CROSS-REFERENCE TO RELATED APPLICATION

This application claims the benefit of U.S. patent application Ser. No. 11/601,125 filed Nov. 17, 2006, currently abandoned.

The invention relates to an improved process and catalyst system for converting distillate to gasoline. More particularly, the invention relates to a two-stage and two catalyst process and/or system for converting distillate to gasoline.

Under certain market conditions it can be desirable to convert distillate range hydrocarbons to gasoline range hydrocarbons. Thus, there are incentives to develop efficient catalysts and processes useful for the conversion of distillate to gasoline.

SUMMARY OF THE INVENTION

In accordance with an embodiment of this invention, a distillate-to-gasoline catalyst system is provided for the conversion of distillate to gasoline which includes:
 a) a first catalyst comprising a metal component selected from the group consisting of platinum, palladium, and combinations thereof, and an acidic support, and
 b) a second catalyst comprising iridium and an inorganic oxide support.

In accordance with another embodiment of this invention, a process for converting distillate-to-gasoline is provided including the following steps:
 a) contacting a distillate feedstream, in a first reaction zone, with a first catalyst comprising a metal component selected from the group consisting of platinum, palladium, and combinations thereof, and an acidic support, in the presence of hydrogen to produce an intermediate product;
 b) contacting the intermediate product, in a second reaction zone, with a second catalyst comprising iridium and an inorganic oxide support to produce a gasoline-range product.

DETAILED DESCRIPTION OF THE INVENTION

The distillate feedstream of the current invention can be any distillate-range hydrocarbon material. The distillate feedstream typically has an RON in the range of from about 25 to about 50, more particularly in the range of from about 30 to about 40; and comprises, consists of, or consists essentially of: 1) hydrocarbons having in the range of 8 to 24, more particularly 10 to 14 carbon atoms per molecule; 2) at least about 20 wt. %, more particularly at least about 30 wt. %, 1-ring naphthenes; 3) at least about 20 wt. %, more particularly at least about 30 wt. %, 2-ring naphthenes; and 4) at least about 10 wt. %, more particularly at least about 20 wt. %, aromatics; and wherein at least about 25 wt. %, more particularly at least about 30 wt. %, of the distillate feedstream boils at a temperature greater than or equal to about 221° C. The 1-ring naphthenes each have only one six-member ring, and can have a five member ring. The 2-ring naphthenes each have two six-member rings.

The distillate feedstream is converted to a gasoline-range product by processing in a distillate-to-gasoline catalyst system containing a first reaction zone and a second reaction zone.

The distillate feedstream is contacted, in the first reaction zone, with a first catalyst comprising, consisting of, or consisting essentially of an acidic support and a metal component selected from the group consisting of platinum, palladium, and combinations thereof, in the presence of hydrogen to produce an intermediate product.

In the first reaction zone, at least a portion of the aromatic compounds of the distillate feedstream are hydrogenated and at least a portion of the 2-ring naphthenes (which each have two six member rings) are converted, through ring contraction, to form compounds having one six member ring and one five member ring.

The first reaction zone includes a temperature in the range of from about 200° C. to about 300° C., preferably from about 210° C. to about 270° C., more preferably from about 220° C. to about 260° C., a pressure in the range of from about 100 psig to about 500 psig, preferably from about 100 psig to about 400 psig, more preferably from about 200 psig to about 300 psig, and a WHSV for the distillate feedstream of about 0.1 to about 100 hr.$^{-1}$, preferably, from about 0.1 to about 50 hr.$^{-1}$, more preferably from about 0.1 to about 10 hr.$^{-1}$.

The acidic support is preferably a zeolite. The zeolite can be any zeolite suitable for converting the distillate feedstream. Preferably, the zeolite is a Y zeolite, and more preferably is a hydrogen exchanged Y zeolite. The first catalyst also preferably contains from about 0.5 to about 5 weight percent of the metal component, and more preferably contains from about 0.5 to about 3 weight percent of the metal component.

The metal component can be added to the zeolite by any method known for incorporating metals on a support. Preferably, the metal component is incorporated on or into the zeolite by incipient wetness impregnation, optionally followed by drying and calcining in the presence of oxygen. Prior to use in the catalyst system, the first catalyst is reduced in the presence of a reducing gas.

The intermediate product comprises less than or equal to about 5, preferably less than or equal to about 3, and more preferably less than or equal to about 2 wt. % aromatics; and less than or equal to about 15 wt. %, preferably less than or equal to about 10 wt. % 2-ring naphthenes. Less than about 2 wt. %, preferably less than about 1 wt. %, of the intermediate product boils at a temperature greater than or equal to about 221° C.

The intermediate product is contacted, in the second reaction zone, with a second catalyst comprising iridium and an inorganic oxide support, and optionally nickel, to produce a gasoline-range product.

In the second reaction zone, at least a portion of the 2-ring naphthenes and 1-ring naphthenes are converted, through ring opening, to isoparaffins by opening the five member rings first, followed by opening the six member rings.

The second reaction zone includes a temperature in the range of from about 260° C. to about 350° C., preferably from about 270° C. to about 340° C., more preferably from about 280° C. to about 330° C., a pressure in the range of from about 100 psig to about 500 psig, preferably from about 100 psig to about 400 psig, more preferably from about 200 psig to about 300 psig, and a WHSV of from about 0.1 to about 100 hr.$^{-1}$, preferably, from about 0.1 to about 50 hr.$^{-1}$, more preferably from about 0.1 to about 10 hr.$^{-1}$.

The inorganic oxide support can be any such support capable of supporting iridium. Preferably, the inorganic oxide support is selected from the group consisting of silica, alumina and combinations thereof. The second catalyst also preferably contains from about 0.5 to about 5 weight percent iridium, and more preferably contains from about 0.5 to about 3 weight percent iridium.

Iridium, and the optional nickel component, can be added to the inorganic oxide support by any method known for incorporating metals on a support. Preferably, the iridium or iridium/nickel is incorporated on or into the inorganic oxide support by incipient wetness impregnation, optionally followed by drying and calcining in the presence of oxygen. Prior to use in the catalyst system, the second catalyst is reduced in the presence of a reducing gas.

The gasoline-range product produced has an RON of at least about 65, preferably at least about 70, more preferably at least about 75; comprises, consists of, or consists essentially of at least about 40, preferably at least about 45, and more preferably at least about 50 wt. % paraffins, and less than or equal to about 5, preferably less than or equal to about 3, and more preferably less than or equal to about 2 wt. % aromatics, and wherein less than about 2, preferably less than about 1, and more preferably less than about 0.5 wt. % of the gasoline-range product boils at a temperature greater than or equal to about 221° C.

EXAMPLES

The following examples illustrate the effectiveness of the inventive catalyst system in converting a distillate to gasoline-range hydrocarbons.

Pt/HY Zeolite Catalyst

Hydrogen exchanged Y zeolite (HY zeolite) was prepared by ion-exchange of 100 g of NaY zeolite (Si/Al=5.3) through successive exchanges with aqueous solutions containing about 120.5 g ammonium chloride dissolved in one liter of deionized water. After each ion exchange step, the solid was filtered and washed with deionized water. Following the final exchange step the solid was washed until it was chloride free. The solid was dried in air at about 110° C. and calcined in the flow of air at about 500° C. for 2 hours.

The HY zeolite was then impregnated with platinum by incipient wetness impregnation using an aqueous hexachloroplatinic acid solution. After impregnation, the solid was dried at about 110° C., calcined in oxygen at about 300° C. for 3 hours, and then reduced in-situ with hydrogen at about 400° C. for 2 hours to form the Pt/HY zeolite catalyst. The resulting Pt/HY zeolite catalyst contained about 1 wt. % platinum.

$Ir/SiO_2$ and $Ir/Al_2O_3$ Catalysts

Silica and alumina were each separately impregnated with iridium by incipient wetness impregnation using aqueous solutions of iridium chloride. After impregnation, the solids were dried at about 110° C., calcined in oxygen at about 300° C. for 3 hours, and then reduced in-situ with hydrogen at about 400° C. for 2 hours to form the $Ir/SiO_2$ and $Ir/Al_2O_3$ catalysts. The resulting $Ir/SiO_2$ and $Ir/Al_2O_3$ catalysts each contained about 1 wt. % iridium.

About 3 to 8 g quantities of each of the catalysts were used in the following runs.

Distillate samples A and B were contacted with the catalysts at the reaction conditions set out in Tables 1 and 2, which also include the results of the runs.

TABLE 1

|  | Distillate Sample A | Pt/HY alone (1) | Pt/HY (1) + $Ir/SiO_2$ (4) | Pt/HY (1) + $Ir/Al_2O_3$ (4) | Pt/HY alone (2) | Pt/HY (2) + $Ir/SiO_2$ (4) |
|---|---|---|---|---|---|---|
| Paraffins (wt. %) | 24.9 | 29.1 | 58.6 | 54.4 | 28.0 | 40.4 |
| Cyclanes (wt. %) | 58.3 | 70.9 | 41.4 | 45.5 | 72.0 | 59.4 |
| 1-Ring Arom (wt. %) | 15.2 | 0.0 | 0.1 | 0.1 | 0.0 | 0.2 |
| 2-Ring Arom (wt. %) | 1.5 | 0.0 | 0.0 | 0.0 | 0.0 | 0.0 |
| 1-Np ring (**) (wt. %) | 31.8 | 66.5 | 39.2 | 43.6 | 62.9 | 56.7 |
| 2-Np ring + (**) (wt. %) | 26.5 | 4.4 | 2.1 | 1.9 | 9.0 | 2.7 |
| 221° C. (−)*** (wt. %) | 70.1 | 99.6 | 99.6 | 99.5 | 99.5 | 99.5 |
| 95% Off (° F.) | 501.6 | 327.5 | 314.3 | 314.0 | 372.2 | 356.0 |
| RON | 43.9/46.3 (*) | 72.3 | 72.7 | 73.3 | 62.6 | 64.5 |
| Volume Gain (%) | — | 13.4 | 15.6 | 15.5 | 10.4 | 12.2 |

(*) RON for 430° F.(−) fraction
(**) 1-NP ring: 1-Ring Naphthenic compounds - Alkylcyclohexane type 2-NP ring: 2-Ring Naphthenic compounds - Alkyldecalin type
***wt. % of hydrocarbons boiling at or below 221° C. and typically considered gasoline range
Catalysts
First Reactor 1 wt. % Pt/HY
Second Reactor 1 wt. % Iron $SiO_2$ or $Al_2O_3$
Reaction Conditions
(1) T = 255° C.; P = 300 psig; $H_2$/HC = 5000 SCFB WHSV = 3 $h^{-1}$
(2) T = 255° C.; P = 300 psig; $H_2$/HC = 5000 SCFB WHSV = 4.5 $h^{-1}$
(3) T = 255° C.; P = 300 psig; $H_2$/HC = 5000 SCFB WHSV = 5 $h^{-1}$
(4) Sequential reactor; T = 300° C.; WHSV = 2 $h^{-1}$

TABLE 2

|  | Distillate Sample B | Pt/HY alone (1) | Pt/HY (1) + Ir/SiO$_2$ (4) | Pt/HY alone (3) | Pt/HY (3) + Ir/SiO$_2$ (4) |
|---|---|---|---|---|---|
| Paraffins (wt. %) | 26.9 | 36.1 | 59.1 | 34.1 | 43.7 |
| Cyclanes (wt. %) | 58.7 | 63.9 | 40.9 | 65.9 | 56.2 |
| 1-Ring Arom (wt. %) | 14.2 | 0.0 | 0.0 | 0.0 | 0.0 |
| 2-Ring Arom (wt. %) | 0.2 | 0.0 | 0.0 | 0.0 | 0.0 |
| 1-Np ring (**) (wt. %) | 28.2 | 61.7 | 39.2 | 60.5 | 52.1 |
| 2-Np ring + (**) (wt. %) | 30.6 | 2.1 | 1.7 | 5.4 | 4.1 |
| 221° C. (−)*** (wt. %) | 41.0 | 99.6 | 99.6 | 99.5 | 99.5 |
| 95% Off (° F.) | 578.8 | 295.3 | 288.6 | 338.3 | 357.2 |
| RON | 26.6 | 75.8 | 73.5 | 67.8 | 67.4 |
| Volume Gain (%) |  | 16.9 | 19.0 | 13.3 | 15.5 |

(*) RON for 430° F.(−) fraction
(**) 1-NP ring: 1-Ring Naphthenic compounds - Alkylcyclohexane type 2-NP ring: 2-Ring Naphthenic compounds - Alkyldecalin type
***wt. % of hydrocarbons boiling at or below 221° C. and typically considered gasoline range
Catalysts
First Reactor 1 wt. % Pt/HY
Second Reactor 1 wt. % Iron SiO$_2$ or Al$_2$O$_3$
Reaction Conditions
(1) T = 255° C.; P = 300 psig; H$_2$/HC = 5000 SCFB WHSV = 3 h$^{-1}$
(2) T = 255° C.; P = 300 psig; H$_2$/HC = 5000 SCFB WHSV = 4.5 h$^{-1}$
(3) T = 255° C.; P = 300 psig; H$_2$/HC = 5000 SCFB WHSV = 5 h$^{-1}$
(4) Sequential reactor; T = 300° C.; WHSV = 2 h$^{-1}$ As can be seen from the Tables, the inventive catalyst system is very effective in converting a distillate to gasoline-range hydrocarbons, evidenced by the volume gains ranging from about 10% to about 19%, the RON gains ranging from about 16 to about 49 RON numbers, and the near complete conversion of the distillate to 221° C.(−) hydrocarbons.

Whereas this invention has been described in terms of the preferred embodiments, reasonable variations and modifications are possible by those skilled in the art. Such modifications are within the scope of the described invention and appended claims.

That which is claimed:

1. A process for maximizing octane by converting a low octane distillate feedstream to a high octane gasoline-range hydrocarbons comprising:
   a) contacting the low octane distillate feedstream, in a first reaction zone, with a first catalyst comprising a metal component selected from the group consisting of platinum, palladium, and combinations thereof, and an acidic support in the presence of hydrogen to produce an intermediate product; and
   b) contacting said intermediate product, in a second reaction zone, with a second catalyst comprising iridium and an inorganic oxide support to produce a high octane gasoline-range product.

2. The process of claim 1 wherein said first reaction zone includes a temperature in the range of from about 200° C. to about 300° C., a pressure in the range of from about 100 psig to about 500 psig, and a WHSV for said low octane distillate feedstream of about 0.1 to about 100 hr.$^{-1}$.

3. The process of claim 1 wherein said first reaction zone includes a temperature in the range of from about 220° C. to about 260° C., a pressure in the range of from about 200 psig to about 300 psig, and a WHSV for said low octane distillate feedstream of about 0.1 to about 10 hr.$^{-1}$.

4. The process of claim 1 wherein said second reaction zone includes a temperature in the range of from about 260° C. to about 350° C., a pressure in the range of from about 100 psig to about 500 psig, and a WHSV of from about 0.1 to about 100 hr.$^{-1}$.

5. The process of claim 1 wherein said second reaction zone includes a temperature in the range of from about 280° C. to about 330° C., a pressure in the range of from about 200 psig to about 300 psig, and a WHSV of from about 0.1 to about 10 hr.$^{-1}$.

6. The process of claim 1 wherein said acidic support is a Y zeolite and wherein said second catalyst further comprises nickel.

7. The process of claim 6 wherein said Y zeolite is hydrogen exchanged.

8. The process of claim 1 wherein said first catalyst contains from about 0.5 to about 5 weight percent metal component.

9. The process of claim 1 wherein said second catalyst contains from about 0.5 to about 5 weight percent iridium.

10. The process of claim 1 wherein said first catalyst contains from about 0.5 to about 3 weight percent metal component.

11. The process of claim 6 wherein said second catalyst contains from about 0.5 to about 5 weight percent iridium and from about 0.5 to about 5 weight percent nickel.

12. The process of claim 1 wherein said second catalyst contains from about 0.5 to about 3 weight percent iridium.

13. The process of claim 1 wherein said inorganic oxide support is selected from the group consisting of silica, alumina and combinations thereof 14. The process of claim 1 wherein said inorganic oxide support is silica.

15. The process of claim 1 wherein said inorganic oxide support is alumina.

16. The process of claim 1 wherein said low octane distillate feedstream has an RON in the range of from about 25 to about 50, said low octane distillate feedstream comprises: 1) hydrocarbons having in the range of 8 to 24 carbon atoms per molecule, 2) at least about 20 wt. % 1-ring napthenes, 3) at least about 20 wt. % 2-ring napthenes, and 4) at least about 10 wt. % aromatics; and wherein at least about 25 wt. % of said low octane distillate feedstream boils at a temperature greater than or equal to about 221° C.

17. The process of claim 1 wherein said intermediate product comprises less than or equal to about 5 wt. % aromatics; less than or equal to about 15 wt. % 2-ring naphthenes; and wherein less than about 2 wt. % of said intermediate product boils at a temperature greater than or equal to about 221° C.

18. The process of claim 1 wherein said high octane gasoline-range product has an RON of at least about 65; comprises at least about 40 wt. % paraffins; comprises less than or equal to about 5 wt. % aromatics; and wherein less than about 2 wt. % of said high octane gasoline-range product boils at a temperature greater than or equal to about 221° C.

19. A process for maximizing octane by converting a low octane distillate feedstream to a high octane gasoline-range hydrocarbons comprising:

a) contacting the low octane distillate feedstream, in a first reaction zone, with a first catalyst comprising a metal component selected from the group consisting of platinum, palladium, and combinations thereof, and an acidic support in the presence of hydrogen to produce an intermediate product, wherein said first reaction zone includes a temperature in the range of from about 220° C. to about 260° C., a pressure in the range of from about 200 psig to about 300 psig, and a WHSV for said low octane distillate feedstream of about 0.1 to about 10 hr.$^{-1}$; and b) contacting said intermediate product, in a second reaction zone, with a second catalyst comprising iridium and an inorganic oxide support to produce a high octane gasoline-range product, wherein said second reaction zone includes a temperature in the range of from about 280° C. to about 330° C., a pressure in the range of from about 200 psig to about 300 psig, and a WHSV of from about 0.1 to about 10 hr.$^{-1}$.

* * * * *